Aug. 29, 1933.　　　L. L. JONES　　　1,924,122
AIRPLANE
Filed Dec. 7, 1929

INVENTOR
Lester L. Jones
BY
ATTORNEYS

Patented Aug. 29, 1933

1,924,122

UNITED STATES PATENT OFFICE 1,924,122

AIRPLANE

Lester L. Jones, Oradell, N. J.

Application December 7, 1929. Serial No. 412,312

25 Claims. (Cl. 244—31)

This invention relates to airplanes, and more particularly to a method and means for preventing the formation of sleet on the wings of airplanes.

It has been proposed to feed the exhaust gas from airplane engines into the wing chamber of airplanes, or into appropriate conduits therein, for a variety of purposes. For example, the exhaust gas may be supplied to the wing chamber in order to muffle the exhaust noise, or in order to aid the exhaust or increase the lifting power of the airplane by discharging the exhaust gas at appropriate points on the wing structure. Probably of greatest importance is the proposal to use the exhaust gas to prevent sleet formation on the wings of the airplane, for this is a source of considerable danger, inasmuch as under favorable conditions the growth of ice on the plane may be quite rapid, possibly a half inch in thickness in an hour, thereby causing an increase in the weight of a typical three-motored plane of about a ton. Approximately 30 percent of the heat energy in the fuel used for propelling the airplane is lost in the exhaust thereof, and it may readily be demonstrated that this heat content in the case of say a three-motored plane employing 400 horsepower motors is sufficient to melt a ton of ice an hour. In the case of smaller planes the available energy is reduced, but the wing surface is also reduced.

This scheme for sleet melting is most readily applicable to airplanes of all metal construction, but is not limited to such structures provided that suitable precaution is taken against fire. Even with metal structures where the fire hazard is reduced, there still is considerable danger of explosion of the exhaust gas in the wing chamber, and the primary object of the present invention is to provide a method and means for preventing or minimizing the possibility of explosion of the exhaust gas in the wing chamber of airplanes in which the exhaust gas is fed to the wing chamber for any of the reasons outlined above, or other similar causes.

In accordance with the present invention, the exhaust gas is so greatly diluted with air that explosion is impossible. For example, the exhaust gas is diluted with a volume of air approximately twice the volume of the exhaust gas, this proportion being considerably above that at which explosion might take place.

As a further precaution against burning or explosion in the wing chamber, the exhaust gas may be continuously ignited during its passage from the engine to the wing chamber.

The greatest danger from explosion exists during the warming up of the motor, or upon sudden slowing up of the motor, or upon failure of the engine ignition during the flight of the airplane, which will permit the discharge of rich unburned gas mixture into the wing chamber. These various conditions are characterized by a relatively low engine speed. Under sleet forming conditions the airplane will necessitate considerable traction, and therefore a relatively high engine speed. Advantage of this is taken in the practice of my invention, for as an additional precaution against the danger of explosion, the exhaust gas is diverted from the wing chamber and discharged directly into the atmosphere in the conventional manner whenever the motor speed is reduced substantially below normal. Differently expressed, the exhaust gas is fed from the engine to the wing chamber only when the engine speed is in a range of normal propelling speed.

During long airplane flights it is desirable to have available a supply of water, which may be used as cooling water in the case of water cooled engines, and which may be used for washing, and similar purposes. In accordance with a further feature of my invention, advantage is taken of the cooling of the exhaust gas in the wing chamber, and the consequent condensation of exhaust moisture, by draining the condensate from the wing chamber and collecting as much of the water as may be needed for utilization. The remainder may be discarded, but in either case proper drainage is essential because the quantity of exhaust moisture is quite great, being greater than the quantity of gasoline consumed, and in the case of large planes, over twenty gallons an hour.

To the accomplishment of the foregoing and such other objects as will hereinafter appear, my invention resides in the method and elements and their relation one to the other as hereinafter are more particularly described in the specification and sought to be defined in the claims. The specification is accompanied by a drawing in which:

Figure 1:
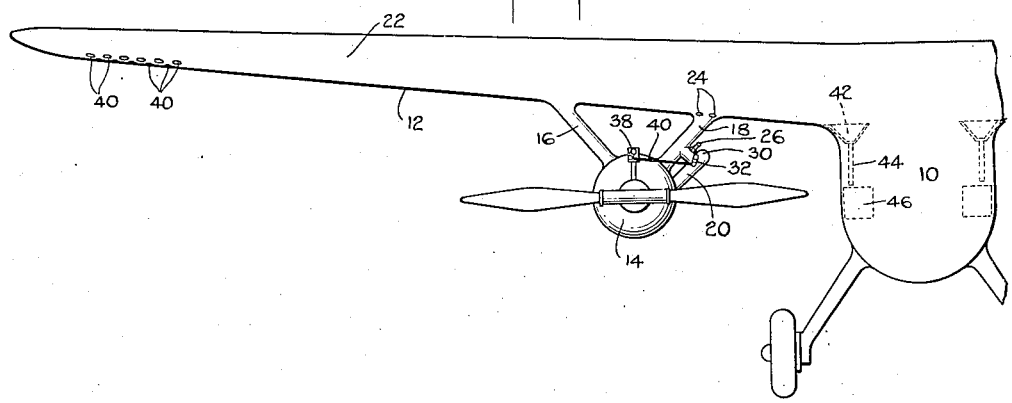
Fig. 1 is a partial elevation of an airplane embodying my invention.

Referring to the drawing, the airplane comprises generally a fuselage 10, a wing structure 12, an internal combustion engine 14, here shown as supported in an engine nacelle fixed to the wing structure 12 by supporting struts 16 and 18. The supporting strut 18 acts also as a pipe for conducting the exhaust gas from the engine exhaust pipe 20 to the wing chamber 22.

In accordance with the present invention, the exhaust gas supplied to the wing chamber is so greatly diluted with air that explosion is made impossible. This air dilution may be provided simply by a series of air inlets 24, surrounding the juncture of the strut 18 with the wing 12. The region being one of high pressure causes considerable flow of air into the wing chamber. The volume of air should be about twice the volume of exhaust gas, this ratio causing sufficient dilution for safety. The proportion is preferably made such that even if the entire supply of air at the carburetter is shut off the air dilution caused by the inlets 24 will still be sufficient to avoid explosion.

If desired, the additional precaution may be taken of igniting the exhaust gas on its passage from the engine to the wing chamber. In the present embodiment of the invention, this ignition is caused by a spark plug 26, inserted in the branch conduit 28, which interconnects the engine exhaust pipe 20 and the strut 18. The spark plug 26 is continuously energized for continuous ignition of any unexploded gas from the engine, thereby preventing accumulation of unexploded gas in the wing chamber. This feature is best applicable to all-metal planes, and at least the conduits 28 and 18 should be of metal, and the point of ignition sufficiently spaced from any non-metal structure to prevent fire.

Figure 2:
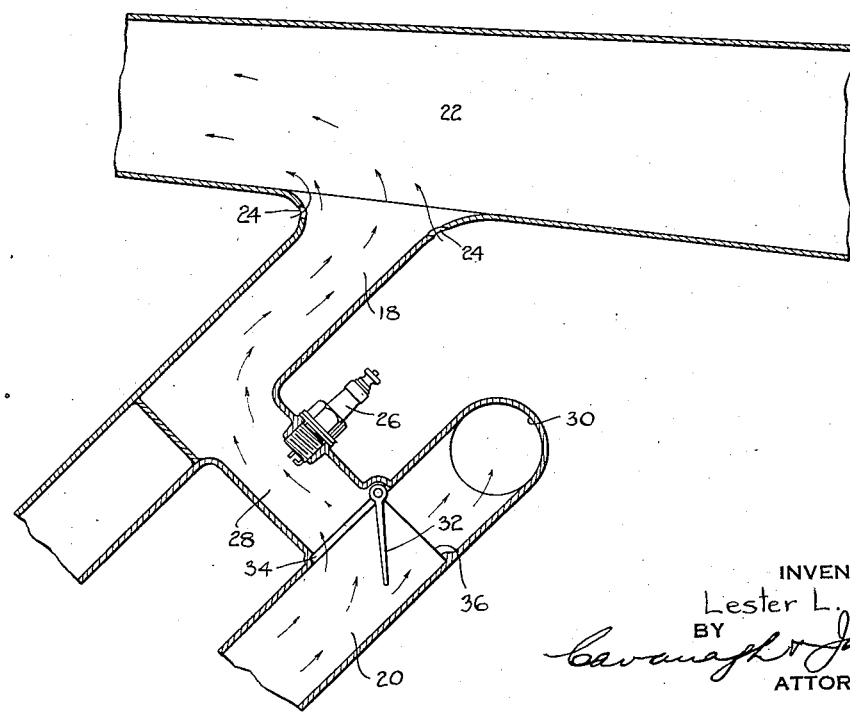
Fig. 2 is a section showing a detail of the arrangement in Fig. 1.

As is most clearly shown in Fig. 2, the engine exhaust pipe 20 is connected to the usual type of atmospheric exhaust pipe 30. A valve 32 is provided which may be operated to cause the engine exhaust gas to flow either into the wing chamber 22, or into the exhaust pipe 30, or partially in each. This valve may be manually manipulated, and in such case the operator will close the valve 32 against the seat 34 so as to divert the exhaust gas from the wing chamber 22, and into the exhaust pipe 30, when the engine is merely being warmed up, or should the engine begin to miss, indicating faulty ignition.

As a still further improvement, the valve 32 may be automatically operated, the valve being moved against the seat 36 so as to cause the exhaust gas to flow into the engine chamber when the engine speed is in a range of normal propelling speed, and moving the valve 32 against the seat 34, thereby diverting the exhaust gas from the wing chamber whenever the engine speed falls substantially below normal. Such an arrangement is schematically indicated in Fig. 1, in which governor operated mechanism housed at 38 is connected by suitable link work 40 to the valve 32. In this manner, when warming up or when the ignition is interrupted for any reason, the resulting reduction in engine speed may be utilized to upset an otherwise balanced governor position, and the unbalance may be used to positively close the valve 32 against the seat 34 or, in other words, the valve is oscillated between its extreme positions only.

If desired, the circuit for the energization of the spark plug or similar ignition means 26 may be interconnected with the valve mechanism 32 so as to discontinue ignition when the valve is closed against the seat 34.

The air and gas mixture supplied to the wing chamber is discharged from the wing chamber preferably at points near the wing tips in order that as much of the wing surface as possible may be warmed by the exhaust gas. The discharge may be through a multiplicity of small holes 40 in the lower wing surface at points where, owing to the imperfections in the wing design, there is low, rather than high, pressure. With the discharge openings located in this manner the low pressure assists the engine exhaust by reducing the back pressure, and at the same time the exhaust pressure improves the lifting power of the wing by relieving the low pressure areas on the lower surface thereof.

The passage of the exhaust gas through the wing chamber may be designed to produce a muffling action in order to reduce the engine noise. In such case the air inlet openings 24, for diluting the exhaust gas, should be located a small distance away from the gas inlet so as to minimize the direct passage of sound through these openings from the wing. The wing may be subdivided and baffled in known ways, particularly in the region of the exhaust gas inlet into the wing, in order to reduce the generation and propagation of noise.

The exhaust gas contains considerable moisture due to the combustion of the hydrocarbons in the fuel, and this moisture will ordinarily exceed the amount of gasoline consumed in the first instance. The temperature of the atmosphere under sleet forming conditions is usually only a few degrees lower than the freezing temperature of water. The exhaust gas, because of the large wing surface to be warmed, is cooled down to a temperature only slightly above that of the atmosphere, and, of course, the exhaust moisture or steam is readily condensed. Suitable provision should be made for the drainage of this condensed moisture. In the present instance the design of the airplane is such that the wings are sloped for stability, and the slope is in the proper direction to permit drainage toward the fuselage. The internal wing structure must be fitted with suitable drainage openings to prevent localization or accumulation of water in sections of the wings, by permitting free drainage. If the water is not to be collected it may be drained at a number of points along the wing, but in the present case the drainage is indicated as taking place entirely into the trough 42, from which a drain pipe 44 leads to a collecting tank 46. Excess water may, of course, be discharged, as by an overflow outlet in the tank. The water collected in this manner is useful for cooling water if the engines are water cooled, and may also be used for lavatory purposes in the case of long distance passenger carrying planes.

It may be well to point out that the addition of the air dilution to the exhaust gas does not appreciably reduce the ice melting capacity of the exhaust gas. The reason for this is that the wing area is so large that the exhaust gas is cooled nearly to the temperature of the outside air by the time it is discharged, so that the heat content of the exhaust gas is surrendered to the wing surface regardless of whether or not air dilution is employed. The air mixed with the exhaust gas may be increased to three or four times the exhaust volume without appreciably affecting the thermal efficiency, for the only heat lost would be the heat needed to raise the temperature of the air mixed with the gas a few degrees. The situation is quite different from other and more customary heat exchanging apparatus, in which the final gas temperature is quite high compared with the surrounding temperature, in which case temperature reduction by dilution would reduce the heat transfer or heat exchange.

From the foregoing description it will be understood that the various features for providing safety when feeding engine exhaust gas into an airplane wing chamber may be used singly or in combination, as desired. Furthermore, these features are applicable to airplanes in which the exhaust gas is led into the wing chamber for any of a number of purposes, or for a plurality of such purposes, as described. It will also be obvious that while only half of the airplane has been illustrated in the drawing, the other half will correspond with the half shown, resulting in a preferably symmetrical arrangement.

It will be apparent that while I have shown and described my invention in the preferred form, many changes and modifications may be made in the method and structure disclosed without departing from the spirit of the invention, defined in the following claims.

I claim:

1. In the operation of an airplane in which the engine exhaust gas flows through the wing chamber, the method of preventing the possibility of explosion in the wing chamber which includes the step of so greatly diluting the exhaust gas with air that explosion is impossible.

2. In the operation of an airplane in which the engine exhaust gas flows through the wing chamber, the method of preventing the possibility of explosion in the wing chamber which includes the step of diluting the exhaust gas with a volume of air approximately twice the volume of the exhaust gas.

3. In the operation of an airplane propelled by an internal combustion engine, the method of preventing the formation of sleet on the wings of the airplane which includes causing the exhaust gas of the engine to flow through the wing chamber, simultaneously diluting the exhaust gas with sufficient air to prevent explosion within the wing chamber, and discharging the air and gas mixture from the wing chamber at points of low pressure on the lower surface thereof.

4. In the operation of an airplane propelled by an internal combustion engine, the method of preventing the formation of sleet on the wings of the airplane which includes causing the exhaust gas of the engine to flow through the wing chamber, simultaneously diluting the exhaust gas with a volume of air approximately twice the volume of the exhaust gas, and discharging the air and gas mixture from the wing chamber at points of low pressure on the lower surface thereof.

5. In the operation of an airplane propelled by an internal combustion engine the method of preventing the formation of sleet on the wings of the airplane which includes causing the engine exhaust gas to flow through the wing chamber, continuously igniting the exhaust gas during its passage from the engine to the wing chamber, and discharging the exhaust gas from the wing chamber at points of low pressure on the lower surface thereof.

6. In the operation of an airplane in which the motor exhaust flows through the wing chamber, the method of preventing explosion in the wing chamber due to the exhaust gas becoming excessively rich upon slowing up of the motor, which includes the step of diverting the exhaust gas from the wing chamber whenever the motor speed is reduced substantially below normal.

7. In the operation of an airplane propelled by an internal combustion engine, the method of preventing the formation of sleet on the wings of the airplane which includes feeding the exhaust gas from the engine to the wing chamber when the engine speed is in a range of normal propelling speed, and diverting the exhaust gas from the wing chamber whenever the engine speed falls substantially below normal.

8. In the operation of an airplane propelled by an internal combustion engine, the method of preventing the formation of sleet upon the wings of the airplane which includes feeding the exhaust gas into the wing chamber, continuously igniting the exhaust gas during its passage from the engine to the wing chamber, greatly diluting the exhaust gas with air, and discharging the air and gas mixture from the wing chamber at points of low pressure on the lower surface of the wing.

9. In the operation of an airplane propelled by an internal combustion engine, the method of preventing the formation of sleet upon the wings of the airplane which includes feeding the exhaust gas into the wing chamber, greatly diluting the exhaust gas with air, discharging the air and gas mixture from the wing chamber at points of low pressure on the lower surface of the wing, and draining the condensed exhaust moisture from the wing chamber.

10. In the operation of an airplane propelled by an internal combustion engine, the method of preventing the formation of sleet upon the wings of the airplane which includes feeding the exhaust gas into the wing chamber, continuously igniting the exhaust gas during its passage from the engine to the wing chamber, greatly diluting the exhaust gas with air, discharging the air and gas mixture from the wing chamber, and draining the condensed exhaust moisture from the wing chamber.

11. In the operation of an airplane propelled by a combustion engine, the method of preventing the formation of sleet upon the wings of the airplane which includes feeding the exhaust gas into the wing chamber when the engine speed is in a range of normal propelling speed, greatly diluting the exhaust gas with air, discharging the air and gas mixture from the wing chamber, diverting the exhaust gas from the wing chamber whenever the engine speed falls substantially below normal, and draining the condensed exhaust moisture from the wing chamber.

12. In the operation of an airplane propelled by an internal combustion engine, the method of preventing the formation of sleet upon the wings of the airplane which includes feeding the exhaust gas into the wing chamber when the engine speed is in a range of normal propelling speed, continuously igniting the exhaust gas during its passage from the engine to the wing chamber, greatly diluting the exhaust gas with air, discharging the air and gas mixture from the wing chamber, diverting the exhaust gas from the wing chamber whenever the engine speed falls substantially below normal, and draining the condensed exhaust moisture from the wing chamber.

13. In the operation of an airplane propelled by an internal combustion engine, the method of preventing the formation of sleet upon the wings of the airplane which includes feeding the exhaust gas into the wing chamber when the engine speed is in a range of normal propelling speed, continuously igniting the exhaust gas during its passage from the engine to the wing chamber, diluting the exhaust gas with a volume of air approximately twice the volume of the exhaust gas, discharging the air and gas mixture from the wing chamber at points of low pressure on the lower surface of the wing, diverting the exhaust gas from the wing chamber whenever the engine speed falls substantially below normal, and draining and collecting the condensed exhaust moisture from the wing chamber.

14. An airplane comprising a wing chamber, an engine, means to cause the exhaust gas from the engine to flow through the wing chamber, and means to so greatly dilute the exhaust gas with air that explosion is impossible.

15. An airplane comprising a wing chamber, an internal combustion engine, and means to prevent the formation of sleet on the wings of the airplane including means to cause the exhaust gas from the engine to flow through the wing chamber, means to dilute the exhaust gas with sufficient air to prevent explosion within the wing chamber, and means to discharge the air and gas mixture from the wing chamber at points of low pressure on the lower surface thereof.

16. An airplane comprising a wing chamber, an internal combustion engine, and means to prevent the formation of sleet on the wings of the airplane including means to cause the exhaust gas from the engine to flow through the wing chamber, means for continuously igniting the exhaust gas during its passage from the engine to the wing chamber, and means to discharge the exhaust gas from the wing chamber at points of low pressure on the lower surface thereof.

17. An airplane comprising a wing chamber, a motor, means to feed the exhaust gas from the motor through the wing chamber, and means to prevent explosion in the wing chamber, due to the exhaust gas becoming excessively rich upon slowing up of the motor, by diverting the exhaust gas from the wing chamber whenever the motor speed is reduced substantially below normal.

18. An airplane comprising a wing chamber, an internal combustion engine, means to feed the exhaust gas from the engine into the wing chamber, means to continuously ignite the exhaust gas during its passage from the engine to the wing chamber, means to greatly dilute the exhaust gas with air, and means to discharge the air and gas mixture from the wing chamber at points of low pressure on the lower surface of the wing.

19. An airplane comprising a wing chamber, means to feed the exhaust gas from the engine into the wing chamber, means to greatly dilute the exhaust gas with air, means to discharge the air and gas mixture from the wing chamber at points of low pressure on the lower surface of the wing, and means to drain the condensed exhaust moisture from the wing chamber.

20. An airplane comprising a wing chamber, an internal combustion engine, means to feed the exhaust gas from the engine into the wing chamber, means to continuously ignite the exhaust gas during its passage from the engine to the wing chamber, means to greatly dilute the exhaust gas with air, means to discharge the air and gas mixture from the wing chamber, and means to drain the condensed exhaust moisture from the wing chamber.

21. An airplane comprising a wing chamber, an internal combustion engine, means to feed the exhaust gas from the engine into the wing chamber when the engine speed is in the range of normal propelling speed, means to greatly dilute the exhaust gas with air, means to discharge the air and gas mixture from the wing chamber, means to divert the exhaust gas from the wing chamber whenever the engine speed falls substantially below normal, and means to drain the condensed exhaust moisture from the wing chamber.

22. An airplane comprising a wing chamber, an internal combustion engine, means to feed the exhaust gas from the engine to the wing chamber when the engine speed is in the range of normal propelling speed, means to continuously ignite the exhaust gas during its passage from the engine to the wing chamber, means to greatly dilute the exhaust gas with air, means to discharge the air and gas mixture from the wing chamber, means to divert the exhaust gas from the wing chamber whenever the engine speed falls substantially below normal, and means to drain the condensed exhaust moisture from the wing chamber.

23. An airplane comprising a wing chamber, an internal combustion engine, means to feed the exhaust gas from the engine to the wing chamber when the engine speed is in the range of normal propelling speed, means to continuously ignite the exhaust gas during its passage from the engine to the wing chamber, means to dilute the exhaust gas with twice its volume of air, discharge openings for the air and gas mixture at points of low pressure on the lower surface of the wing, means to divert the exhaust gas from the wing chamber whenever the engine speed falls substantially below normal, and means to drain and collect the condensed exhaust moisture from the wing chamber.

24. In the operation of an airplane propelled by an internal combustion engine, the method of preventing the formation of sleet on the wings of the airplane, which includes causing the exhaust gas of the engine to flow through the wing chamber, and preventing the possibility of explosion in the wing chamber by so greatly diluting the exhaust gas with air that explosion is impossible.

25. An airplane comprising a wing chamber, an internal combustion engine, and means to prevent the formation of sleet on the wings of the airplane including means to cause the exhaust gas from the engine to flow through the wing chamber, and means to so greatly dilute the exhaust gas with air that explosion is impossible.

LESTER L. JONES.